UNITED STATES PATENT OFFICE.

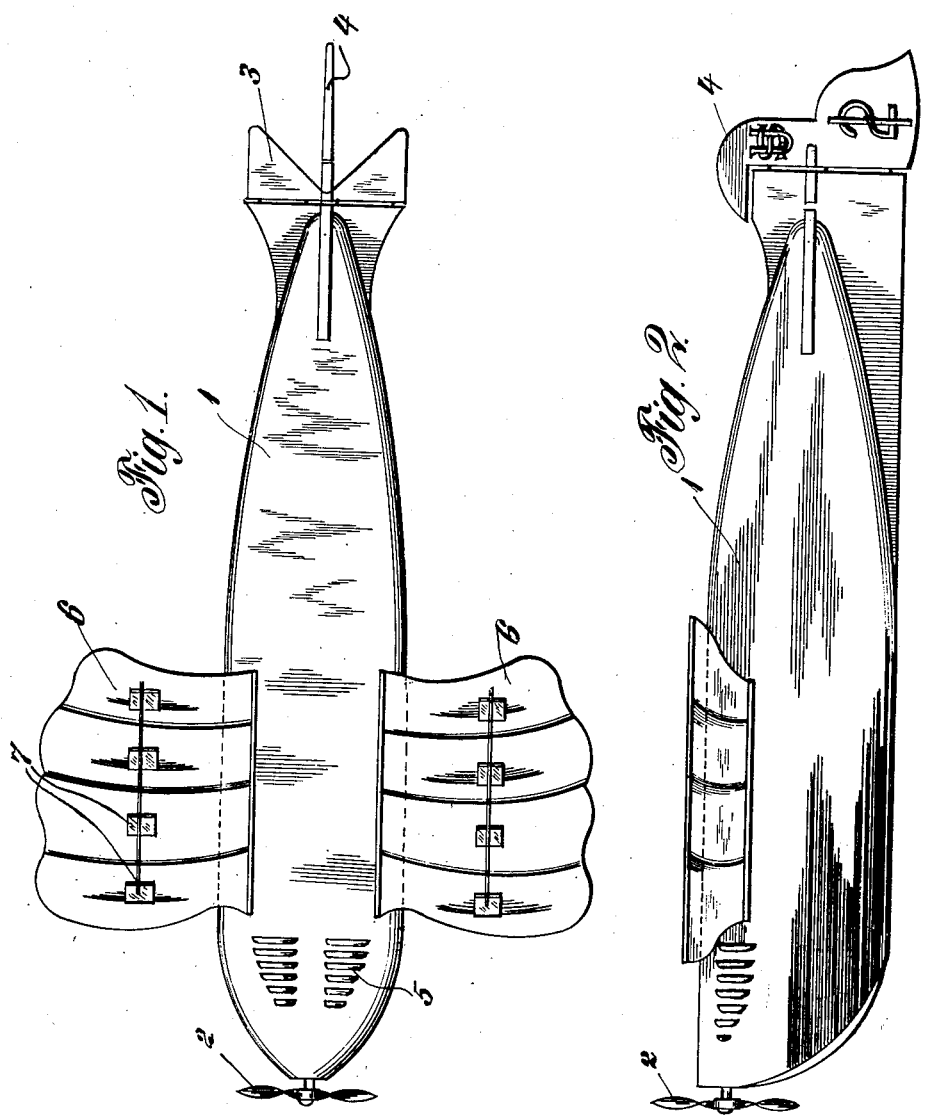

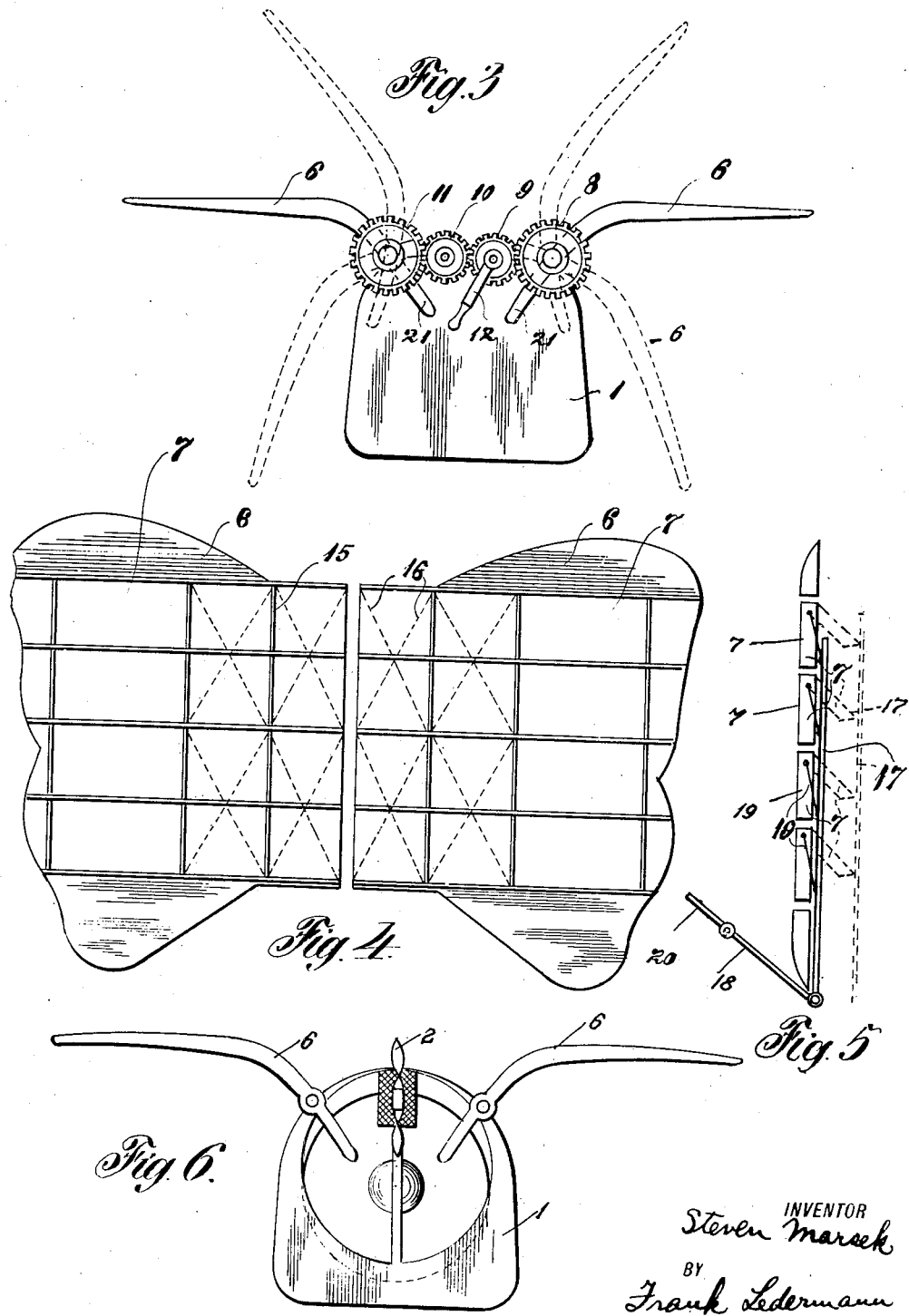

STEVEN MARSEK, OF NEW YORK, N. Y.

AIRSHIP.

1,331,517.   Specification of Letters Patent.   Patented Feb. 24, 1920.

Application filed October 22, 1919. Serial No. 332,458.

*To all whom it may concern:*

Be it known that I, STEVEN MARSEK, a citizen of the United States, residing at New York, in the county of New York and State of New York, have invented certain new and useful Improvements in Airships, of which the following is a specification.

This invention relates to improvements in airships, and has for its main object the provision of movable wings by means of which the airship may be made to alight from or land upon an area of small dimensions.

Another object of my invention is to provide such wings which are readily and conveniently operable, and are simple in construction and proficient in operation.

Referring briefly to the drawings, Figure 1 is a plan view of an airship equipped with my wings.

Fig. 2 is a side elevational view of the same.

Fig. 3 is a detail view showing the manner of operation of the wings.

Fig. 4 is a detailed view showing the construction of the wings.

Fig. 5 a detailed view of the shutters on the wings, indicating the manner of their operation.

Fig. 6 is a front elevational view of the airship shown in Figs. 1 and 2.

Referring now in detail to the drawings, the numeral 1 represents the body of an airship, 2 the propeller thereof, 3 the vertical rudder and 4 the horizontal rudder, and 5 the motor ventillation ducts. My wings are indicated at 6, and the shutters therein are indicated generally at 7.

In Fig. 3 I have illustrated one form of operating mechanism for my wings, although I do not thereby desire to limit myself to this form, as apparently other operating means may be employed, such as cables, ropes, wires, or cords, and pulleys suitably arranged. In Fig. 3 the wings are operated to move up and down in the fashion of the wings of a bird by manipulation of the lever 12, which is conveniently located near the driver's seat. This lever, on movement thereof, directly rotates the gear 8 and hence moves the wing 6 geared to the gear 9. Likewise the lever causes rotation of the idle gear 10 and thence of the wing gear 11, thus causing rotation of the wing 6 geared to the latter gear. Thus it is apparent that, on manipulation of the lever 12 both wings 6 are caused to rise or fall together.

In Fig. 4 I have illustrated the frame work of my wings, comprising a main frame 15 and interlinking wires 16, space being left therein for the shutters 7.

The operation of said shutters is indicated in Fig. 5, in which the shutters 7 are shown joined by link rods 19 to a long rod 17. The latter is pivoted to lever 18 having a handle 20. On manipulation of said handle the shutters are opened or closed at will. The shutters will be opened when it is desired to descend rapidly, and remain closed for a slow descent.

The inner ends 21 of the wings 6 project inwardly to perform the function of balancing weights, and thereby reduce the required force to operate the wings.

Having thus described my invention, what I claim and desire to secure by Letters Patent is as follows:

1. An airship comprising a body, wings pivotally mounted in said body, means for operating said wings comprising gears on said wings, a lever having a gear thereon engaging with one of said wing-gears, an idle gear engaging with the other of said wing gears, a plurality of shutters in each of said wings, means for operating said shutters comprising a long rod running at right angles to said body, links pivotally connecting said shutters with said rod, and a pivoted lever attached to said rod.

2. An airship comprising a body, wings pivotally mounted in said body, means for operating said wings comprising gears on said wings, a lever having a gear thereon engaging with one of said wing gears, a plurality of shutters in each of said wings, an idle gear engaging the other of said wing gears, means for operating said shutters comprising a long rod running at right angle to said body, links pivotally connecting said shutters with said rod, and a pivoted lever attached to said rod, said wings having balancing ends projecting inward toward said body.

In testimony whereof I affix my signature.

STEVEN MARSEK.